United States Patent [19]

Thum

[11] Patent Number: 4,774,269

[45] Date of Patent: Sep. 27, 1988

[54] PROCESS FOR THE PREPARATION OF A FILLED POLYOLEFIN MOLDING MATERIAL

[75] Inventor: Gerhard Thum, Hofheim am Taunus, Fed. Rep. of Germany

[73] Assignee: Hoechst Aktiengesellschaft, Frankfurt am Main, Fed. Rep. of Germany

[21] Appl. No.: 49,384

[22] Filed: May 12, 1987

[30] Foreign Application Priority Data

May 14, 1986 [DE] Fed. Rep. of Germany ....... 3616222

[51] Int. Cl.$^4$ .......................... C08K 3/20; C08K 3/08; C08F 2/44; C08L 23/02
[52] U.S. Cl. .................................... 523/200; 524/430; 524/141; 524/786; 427/302; 427/385.5; 428/407
[58] Field of Search ................ 523/200; 524/430, 441, 524/786; 428/407; 427/302, 385.5

[56] References Cited

U.S. PATENT DOCUMENTS 3,503,785  3/1970  Kruse .
3,950,303  4/1976  Lipscomb ............................ 523/200
4,241,112  12/1980 Kostandov et al. ................ 523/205
4,293,673  10/1981 Hamer et al. ....................... 526/352
4,564,647  1/1986  Hayashi et al. ..................... 523/200
4,705,648  11/1987 Reichert et al. .................... 524/441

FOREIGN PATENT DOCUMENTS 0142143  4/1985  European Pat. Off. .
0167000  1/1986  European Pat. Off. .
2459118  6/1975  Fed. Rep. of Germany .
2936892  4/1981  Fed. Rep. of Germany .
3240382  5/1984  Fed. Rep. of Germany ...... 523/200

Primary Examiner—Herbert J. Lilling

[57] ABSTRACT

A filled polyolefin molding material having a very high filler content and containing no filler-free polymer and no polymer-free filler is obtained when the Ziegler catalyst is initially formed on the filler and the catalyst-charged filler is then used for the polymerization without addition of further catalyst or activator. The molding material is highly suitable, in particular when it has a high content of aluminum powder, for the production of molded parts having good thermal conductivity and a high electrical volume resistance.

4 Claims, No Drawings

PROCESS FOR THE PREPARATION OF A FILLED POLYOLEFIN MOLDING MATERIAL

The present invention relates to a process for the preparation of a filled polyolefin molding material which, if appropriate after mixing with further polymers, can be used for the production of highly heat-conductive and simultaneously electroinsulating molded parts for electrical and electronic components and equipment.

It is known that solid fillers, such as, for example, inorganic or organic fibers, can be incorporated into polyolefins by physical methods, such as mixing or coextrusion. However, at a high filler content the mechanical properties of the polyolefin compounds are adversely influenced since uniform distribution, and thereby also rigid bonding between the polymer and the solid filler, is not achieved on processing. A number of proposals have already been made to overcome these disadvantages.

Thus, a process has been disclosed for the preparation of filled polyolefin materials in which, by polymerization in the presence of the solid filler, better adhesion of the polyolefin to the surface of the filler is to be achieved (cf. German Offenlegungsschrift No. 2,459,118). The fillers in this process are preferably aluminum silicates or metal oxides on the surface of which a catalytically active transition-metal compound is located. The disadvantage of this process is the incomplete occupancy of the surface of the filler by the catalyst and, as a consequence, also incomplete covering of the filler by the polyolefin.

A process has furthermore been disclosed for the polymerization of ethylene in the presence of filler materials such as, for example, metals, metal oxides, organic pigments etc., in which a soluble catalyst is initially prepared from a transition-metal compound, the filler is subsequently brought into contact with the dissolved catalyst, and, in a further step, the polymerization is carried out in the presence of the filler thus treated and in the presence of an organoaluminum compound as activator (cf. European Offenlegungsschrift No. 142,143). If appropriate, treatment with an alkylaluminum can be carried out before contacting the filler with the transition-metal compound. An essential disadvantage in this process is that, besides filler-free polymer, polymer-free filler is also present. Furthermore, complete covering of the filler with polyethylene does not occur and, in addition, the thickness of the polymeric coating cannot be controlled.

A process has also been disclosed for the application of polymeric coatings to a solid filler by treating the solid filler with (a) an organometallic compound and (b) an organoaluminum compound (cf. U.S. Pat. No. 3,503,785). In this process also, a large amount of filler-free polymer is also present besides polymer-free filler. In addition, high contact concentrations are necessary, which makes it necessary to wash residual amounts of catalyst from the polymer.

It has also been disclosed that some of the abovementioned disadvantages can be eliminated by applying a catalyst to the surface of the solid fillers in the gas phase (German Offenlegungsschrift No. 2,936,892). Besides the high temperature, a disadvantage in this process is that the polymerization does not occur only on the surface of the solid filler, but also on the walls of the polymerization reactor, which, on the one hand, leads to relatively great deposit problems and, on the other hand, leads to free polymer in the product after detachment of the polymer from the reactor wall.

Finally, a process has also been described in which the surface of fillers is initially treated with an aluminoxane solution and the polymerization is subsequently carried out after addition of certain hydrocarbon-soluble Ti or Zr compounds (cf. German Offenlegungsschrift No. 3,240,382). Since the catalyst is not applied to the filler, a large amount of free polymer is also produced in this process. In addition, high aluminoxane concentrations are necessary and the soluble transition-metal compounds used are relatively difficult to prepare.

Furthermore, a process has been disclosed for the preparation of thermally conductive and electroinsulating thermoplastics in which the polyolefins are synthesized with a known, heterogeneous catalyst system in the presence of aluminum or aluminum-containing alloys (cf. European Offenlegungsschrift No. 167,000). A decisive disadvantage of this process is that the catalyst exists in heterogeneous form in suspension during the polymerization and a very large amount of aluminum-free polymer is thereby formed.

It was thus desirable to find a process for the preparation of a filler-containing polyolefin molding material in which the filler content can be varied within a wide range without disadvantageous material properties at very high contents and in which deposit formation in the polymerization reactor does not occur, the thickness of the polymer coating on the filler particles can be adjusted by means of the polymerization conditions, and filler-free polymer and polymer-free filler are not present in the molding material.

It has been found that the object can be achieved by initially forming a Ziegler catalyst on the filler and then using the catalyst-charged filler for the polymerization without addition of further catalyst or activator.

The invention thus relates to a process for the preparation of a filled polyolefin molding material comprising 5 to 90% by weight of a homopolymer of ethylene or propylene and/or a copolymer of ethylene and propylene, and 10 to 95% by weight of a pulverulent filler, by polymerization of ethylene and/or propylene at a temperature of 50° to 110° C. and a pressure of 0 to 12 bar in the presence of a catalyst which comprises a filler having a catalytically active surface, wherein the polymerization is carried out in the presence of a catalyst which has been prepared by bringing the filler, in an aliphatic hydrocarbon, into contact (a) firstly with an organoaluminum compound in an amount from 0.0001 to 0.003 mole per mole of filler at a temperature of 0° to 100° C. for 5 to 60 minutes, and then with (b) a halogen compound of titanium or zirconium in an amount from 0.00001 to 0.0003 mole per mole of filler at a temperature from 0° to 100° C. for 5 to 240 minutes, and which is transferred into a reactor which is separated from the catalyst preparation vessel and which is used without addition of further catalyst or activator, the ethylene and/or propylene to be polymerized being introduced into the reactor in an amount from 0.001 to 0.01 mole per mole of filler and per minute of polymerization time.

The invention furthermore relates to the filled polyolefin molding materials prepared by this process.

The filler to be used for the process according to the invention is a metal powder or metal oxide powder having an average grain diameter of 20 to 800 μm, preferably 30 to 100 μm. Suitable are, for example, copper powder, iron powder, aluminum powder, nickel powder or the pulverulent oxides of iron or aluminum. Preferred are aluminum powder and aluminum oxide powder, in particular aluminum powder. The molding material prepared according to the invention contains 10 to 95% by weight, preferably 80 to 95% by weight, of the pulverulent filler and 5 to 90, preferably 5 to 20, % by weight of a homopolymer of ethylene or propylene and/or a copolymer of ethylene and propylene.

The pulverulent filler is initially brought into contact with an organoaluminum compound.

To accomplish this, the filler is generally suspended, in a reaction vessel under a nitrogen atmosphere, in an aliphatic hydrocarbon which has been freed of unsaturated impurities and of sulfur- or oxygen-containing compounds by hydrogenation, and is stirred vigorously for 5 to 30 minutes in order to remove traces of oxygen. For each 100 g of filler, 700 to 1,500 ml, preferably 800 to 1,100 ml, of the hydrocarbon, which may be, for example, n-hexane, n-heptane, or a petroleum or diesel oil fraction, are used.

To the suspension of the filler, an organoaluminum compound in an amount of 0.0001 to 0.003, preferably 0.0002 to 0.002, mole per mole of filler is then added, and the suspension is stirred at a temperature of 0° to 100°, preferably 15° to 40° C., for 5 to 60, preferably 15 to 30, minutes.

Suitable organoaluminum compounds are halogen-containing organoaluminum compounds, such as dialkylaluminum halides, alkylaluminum dihalides or alkylaluminum sesquihalides, for example $(C_2H_5)_2AlCl$, $(i-C_4H_9)_2AlCl$, $C_2H_5AlCl_2$ and $(C_2H_5)_3Al_2Cl_3$.

Furthermore suitable are the products of the reaction of trialkylaluminums or dialkylaluminum hydrides containing hydrocarbon radicals having 1 to 6 carbon atoms, preferably $Al(i-C_4H_9)_3$ or $Al(i-C_4H_9)_2H$, with diolefins containing 4 to 20 carbon atoms, preferably isoprene. An example which may be mentioned is isoprenylaluminum.

On the other hand, suitable organoaluminum compounds are also trialkylaluminums or alkylaluminum hydrides containing identical or different alkyl radicals having 1 to 16 carbon atoms. Examples are $Al(C_2H_5)$, $Al(C_2H_5)_2H$, $Al(C_3H_7)_3$, $Al(C_3H_7)_2H$, $Al(i-C_4H_9)_3$, $Al(i-C_4H_9)_2H$, $Al(C_8H_{17})_3$, $Al(C_{12}H_{25})_3$, $Al(C_2H_5)(C_{12}H_{25})_2$, $Al(i-C_4H_9)(C_{12}H_{25})_2$.

Mixtures of organometallic compounds from groups I to III of the periodic system, in particular mixtures of different organoaluminum compounds, may also be employed. Examples which may be mentioned are the following mixtures: $Al(C_2H_5)_3$ and $Al(i-C_4H_9)_3$, $Al(C_2H_5)_2Cl$ and $Al(C_8H_{17})_3$, $Al(C_2H_5)_3$ and $Al(C_8H_{17})_3$, $Al(C_4H_9)_2H$ and $Al(C_8H_{17})_3$, $Al(i-C_4H_9)_3$ and $Al(C_8H_{17})_3$, $Al(C_2H_5)_3$ and $Al(C_{12}H_{25})_3$, $Al(i-C_4H_9)_3$ and $Al(C_{12}H_{25})_3$, $Al(C_2H_5)$ and $Al(C_{16}H_{33})_3$, $Al(C_3H_7)_3$ and $Al(C_{18}H_{37})_2(iC_4H_9)$, $Al(C_2H_5)$ and isoprenylaluminum (product of the reaction of isoprene with $Al(i-C_4H_9)$ or $Al(i-C_4H_9)_2H$).

Of all these compounds, trialkylaluminums and dialkylaluminum halides, in particular triethylaluminum and diethylaluminum monochloride, are preferably used.

It is also possible to add the filler to a solution of the organoaluminum compound.

The halogen compound of titanium or zirconium, preferably titanium, is then added to the suspension in an amount of 0.00001 to 0.0003, preferably 0.00005 to 0.0002, mole per mole of filler, and the batch is stirred at a temperature of 0° to 100°, preferably 15° to 40° C., for 5 to 240, preferably 90 to 120, minutes.

The halogen-containing titanium compound is, for example, $TiCl_4$, $TiCl_3(O-n-C_3H_7)$, $TiCl_3(O-n-C_3H_7)$, $TiCl_2(O-n-C_3H_7)_2$, $TiCl(O-n-C_3H_7)_3$, $TiCl_2(O-i-C_3H_7)_2$, $TiCl_3(O-i-C_3H_7)$, $TiCl_3(O-CH_2C_6H_5)$, $TiCl_2(O-CH_2C_6H_5)_2$, $TiCl_3(O-i-C_4H_9)$ or $TiCl_2(O-i-C_4H_9)$. Titanium tetrachloride is particularly preferred.

Finally, a small amount of a 1-olefin or diolefin in each case having 4 to 10, preferably 4 to 8, carbon atoms is, if appropriate, added to the suspension, 0.0005 to 0.02, preferably 0.002 to 0.005, mole of the 1-olefin or diolefin being employed per mole of filler, and the batch being stirred vigorously for 5 to 240, preferably 50 to 120, minutes at a temperature of 0° to 100°, preferably 15° to 40°, C. If an olefin or diolefin is used, the stirring time after addition of the Ti or Zr compound is reduced to 5 to 60, preferably 15 to 30, minutes, whereupon the olefin or diolefin is added.

The catalyst-charged filler is used for the polymerization of ethylene and/or propylene in the form of the present suspension, or after separation from the suspending agent. For this polymerization, it is transferred into the polymerization reactor in the form of a suspension, and the polymerization is initiated by adding ethylene and/or propylene. No additional catalyst or activator is introduced into the reactor.

The polymerization is carried out at a temperature of 50° to 100°, preferably 70° to 90°, C., under a pressure of 0 to 15, preferably 1 to 7, bar.

In order to achieve strong and complete covering of the filler, the monomer is introduced into the polymerization reactor very slowly during the polymerization process. In this process, 0.01 to 0.1 mole, preferably 0.02 to 0.05 mole, of monomer are added per mole of filler and per 10 minutes.

The thickness of the polymer coating and the quality of the polyolefin, such as density or melt index, can be controlled relatively easily be varying the polymerization parameters, such as time, temperature or pressure. The density of the polyolefin can additionally be adjusted here by varying the amounts of comonomers.

The molding material prepared according to the invention and obtained in this fashion is distinguished by the fact that the polyolefin adheres strongly to the surface of the filler, and by the fact that particularly good homogeneity of the molding material is achieved simultaneously.

An important difference compared to state-of-the-art filled polyolefin molding materials is that a highly filled molding material having a filler content of greater than 80% by weight and up to 95% by weight and which contains neither filler-free polymer nor polymer-free filler can be obtained. Furthermore, every solid filler particle is covered evenly by the appropriate polyolefin in the process according to the invention. In addition, the polymer to be covered can be crosslinked during the polymerization by incorporating diolefins, such as, for example, octa-1,7-diene, whereby the adhesion of the polyolefin to the surface of the filler and the homogeneity of the molding material can be further increased.

For better processing, for example by extrusion or injection molding, the polyolefin molding material prepared according to the invention can be mixed with 2 to 20% by weight, preferably 10 to 15% by weight, of a further polymer, such as, for example, polyamide or polyester.

Such mixtures then still contain up to 80% by volume, preferably 40 to 80% by volume, very particularly preferably 60 to 70% by volume, of the solid filler.

The molding material prepared according to the invention, in particular one with a high content of aluminum powder, can be used to produce molded parts having good thermal conductivity and simultaneously high electrical volume resistance and which can be used for the production of electrical and electronic components and equipment.

EXAMPLE 1

100 g of pulverulent aluminum oxide having an average grain diameter of 100 μm were suspended under a nitrogen atmosphere in 1000 ml of petroleum ether (100/120), and the suspension was stirred vigorously for 15 minutes. 3 mmol of diethylaluminum chloride were then added to the suspension. After stirring for 15 minutes at room temperature, 0.3 mmol of titanium tetrachloride was added. The suspension was then stirred for 2 hours at 40° C., and the activated aluminum oxide was separated off and transferred into a 1.5 liter steel autoclave which had previously been filled with 1000 ml of petroleum ether. After introducing a pressure of 0.5 bar of nitrogen, ethylene was slowly (about 2 g per 10 minutes) introduced into the polymerization reactor. After a polymerization time of 100 minutes at 85° C., 121 g of product were isolated. This corresponds to an aluminum oxide filler content of 83% by weight.

The product obtained was distinguished by a firmly attached homogeneous polymeric coating on the surface of every aluminum oxide particle. In addition, no delamination of the polymeric coating was observed on extrusion.

EXAMPLE 2

100 g of aluminum powder having an average grain diameter of 50 μm were suspended under a nitrogen atmosphere in 1000 ml of petroleum ether, and 5 mmol of triethylaluminum were added to the suspension. After stirring for 15 minutes at room temperature, 0.5 mmol of titanium tetrachloride was added. The suspension was then stirred for 2 hours at room temperature and subsequently transferred into a 1.5 liter steel autoclave. After introducing a pressure of 0.5 bar of nitrogen, ethylene was slowly (about 2 g per 10 minutes) introduced into the polymerization reactor. After a polymerization time of 110 minutes at 85° C., 112 g of product were isolated. This corresponds to an aluminum powder filler content of 89% by weight.

The product obtained was distinguished by a firmly attached and homogeneous polymeric coating on the surface of every aluminum particle. In addition, no delamination of the polymeric coating was observed on extrusion.

EXAMPLE 3

A procedure analogous to Example 2 was followed, but 4 mmol of diethylaluminum chloride were employed in place of 5 mmol of triethylaluminum. After a polymerization time of 95 minutes, 109 g of product were isolated. This corresponds to an aluminum content of 92% by weight.

EXAMPLE 4

A procedure analogous to Example 1 was carried out, but 100 g of aluminum powder (60 μm) were employed in place of pulverulent aluminum oxide, and 4 mmol of diethylaluminum chloride were employed in place of 3 mmol of triethylaluminum.

After transferring the activated aluminum powder into the 1.5 liter steel autoclave, which had previously been filled with 1000 ml of petroleum ether, polymerization was carried out for 80 minutes at 75° C. 110 g of product were obtained, which corresponds to an aluminum powder content of 91% by weight.

The product obtained was distinguished by a firmly attached and complete polymeric coating on the surface of every aluminum particle.

EXAMPLE 5

100 g of pulverulent aluminum oxide having an average grain diameter of 100 pm were suspended under a nitrogen atmosphere in 1000 ml of petroleum ether (100/120), and the suspension was stirred vigorously for 15 minutes. 3 mmol of triethylaluminum were then added to the suspension. After stirring for 15 minutes at room temperature, 0.3 mmol of titanium tetrachloride was added. After stirring for a further 15 minutes at room temperature, 2 ml of hexene were added to the suspension. The suspension was then stirred for 2 hours at 40° C., and the activated aluminum oxide was separated off and transferred into a 1.5 liter steel autoclave. After introducing a pressure of 0.5 bar of nitrogen, ethylene was slowly (about 2 g per 10 minutes) introduced into the polymerization reactor. After a polymerization time of 120 minutes at 85° C., 125 g of product were isolated. This corresponds to an aluminum oxide filler content of 80% by weight.

The product obtained was distinguished by a firmly attached homogeneous polymeric coating on the surface of every aluminum oxide particle. In addition, no delamination of the polymeric coating was observed on extrusion.

EXAMPLE 6

100 g of aluminum powder having an average grain diameter of 70 μm were suspended under a nitrogen atmosphere in 1000 ml of petroleum ether, and 5 mmol of triethylaluminum were added to the suspension. After stirring for 15 minutes at room temperature, 0.5 mmol of titanium tetrachloride was added, and after stirring for a further 15 minutes at room temperature, 4 ml of hexene were added. The suspension was then stirred for 2 hours at room temperature and subsequently transferred to a 1.5 liter steel autoclave. After introducing a pressure of 0.5 bar of nitrogen, ethylene was slowly (about 2 g per 10 minutes) introduced into the polymerization reactor. After a polymerization time of 90 minutes at 85° C., 115 g of product were isolated. This corresponds to an aluminum powder filler content of 87% by weight.

The product obtained was distinguished by a firmly attached and homogeneous polymeric coating on the surface of every aluminum particle. In addition, no delamination of the polymeric coating was observed on extrusion.

EXAMPLE 7

A procedure analogous to Example 6 was followed, but 4 mmol of triethylaluminum were employed in place of 5 mmol of triethylaluminum, and 3 ml of octa-1,7-diene were employed in place of 4 ml of hexene. Polymerization for 100 minutes at 80° C. yielded 114 g of product; this corresponds to an aluminum content of 86% by weight. A density determination of the polyolefin molding material gave the result 1.95 g/cm$^3$.

By extracting with xylene, 5% by weight of the polymerized-on polyethylene could be removed; this had a density of 0.97 g/cm$^3$ and a viscosity index of 295 cm$^3$/g The polymer coating was applied firmly and uniformly to the entire surface of the solid filler.

EXAMPLE 8

A procedure analogous to Example 6 was followed, but 4 ml of butene and 2 ml of octa-1,7-diene were employed in place of 4 ml of hexene. The polymerization was carried out at 75° C. for 80 minutes and produced 108 g of product; this corresponds to an aluminum content of 92.5% by weight.

The polymer coating was applied firmly and uniformly to the entire surface of the filler. No delamination of the polymeric coating was observed on processing.

EXAMPLE 9

Analogously to Example 6, 100 g of aluminum powder (70 μm) were suspended under nitrogen in 1000 ml of petroleum ether (100/120), and the mixture was stirred for 15 minutes at room temperature. 5 mmol of triethylaluminum were then added. After stirring for 15 minutes at room temperature, 0.5 mmol of titanium tetrachloride were added. The suspension was stirred for a further 90 minutes at room temperature and subsequently for 30 minutes at 40° C.

The activated aluminum powder was separated off and transferred into a 1.5 liter steel autoclave which had previously been filled with 1000 ml of petroleum ether. A pressure of 0.5 bar of nitrogen was then introduced into the autoclave at 75° C., and propylene was slowly (about 4 g per 10 minutes) introduced into the autoclave. After polymerizing for 120 minutes at 85° C., 125 g of product were isolated. This corresponds to an aluminum powder filler content of 80% by weight.

I claim:

1. A process for the preparation of a filled polyolefin molding material comprising 5 to 90% by weight of a homopolymer of ethylene or propylene and/or a copolymer of ethylene and propylene, and 10 to 95% by weight of a pulverulent filler, by polymerization of ethylene and/or propylene at a temperature of 50° to 110° C. and a pressure of 0 to 12 bar in the presence of a catalyst which comprises a filler having a catalytically active surface, wherein the polymerization is carried out in the presence of a catalyst which has been prepared by bringing the filler, in an aliphatic hydrocarbon, into contact
   (a) firstly with an organoaluminum compound in an amount of 0.0001 to 0.003 mole per mole of filler at a temperature of 0° to 100° C. for 5 to 60 minutes, and
   (b) then with a halogen compound of titanium or zirconium in an amount of 0.00001 to 0.0003 mole per mole of filler at a temperature of 0° to 100° C. for 5 to 240 minutes, and which is transferred into a reactor which is separated from the catalyst preparation vessel and is used without addition of further catalyst or activator, the ethylene and/or propylene to be polymerized being introduced into the reactor in an amount of 0.001 to 0.01 mole per mole of filler and per minute of polymerization time.

2. The process as claimed in claim 1, wherein the polymerization is carried out in the presence of a catalyst which has, in addition, been brought into contact with a 1-olefin or diolefin, in each case having 4 to 10 carbon atoms, in an amount of 0.0005 to 0.02 mole per mole of filler, at a temperature of 0° to 100° C. for 5 to 240 minutes.

3. The process as claimed in claim 1, wherein
   (a) the organoaluminum compound is a trialkylaluminum or dialkylaluminum halide,
   (b) the halogen compound of titanium or zirconium is a chlorine compound of titanium.

4. The process as claimed in claim 1, wherein the pulverulent filler to be used is an aluminum powder or an aluminum oxide powder having an average grain diameter of 20 to 800 μm.

* * * * *